(12) United States Patent
Boss et al.

(10) Patent No.: US 11,649,613 B2
(45) Date of Patent: May 16, 2023

(54) TRACKING A POSITION OF A WORKING EDGE ON AN IMPLEMENT OF A CONSTRUCTION VEHICLE

(71) Applicant: Trimble Inc., Sunnyvale, CA (US)

(72) Inventors: John Boss, Denver, CO (US); Jon McKendry, Denver, CO (US); Scott Crozier, Westminster, CO (US); Casey Cyrus, Westminster, CO (US); Alex Harrington, Honolulu, HI (US)

(73) Assignee: Trimble Inc., Sunnyvale, CA (US)

( * ) Notice: Subject to any disclaimer, the term of this patent is extended or adjusted under 35 U.S.C. 154(b) by 456 days.

(21) Appl. No.: 16/800,790

(22) Filed: Feb. 25, 2020

(65) Prior Publication Data
US 2021/0262205 A1 Aug. 26, 2021

(51) Int. Cl.
*E02F 9/26* (2006.01)
*G01S 19/14* (2010.01)
(Continued)

(52) U.S. Cl.
CPC ............. *E02F 9/264* (2013.01); *G01S 19/14* (2013.01); *G01S 19/47* (2013.01); *E02F 3/325* (2013.01); *E02F 3/3414* (2013.01)

(58) Field of Classification Search
CPC ......... E02F 9/265; E02F 3/3414; E02F 9/264; E02F 3/32; E02F 3/325; G01S 19/01; G01S 19/14; G01S 19/47
See application file for complete search history.

(56) References Cited

U.S. PATENT DOCUMENTS 6,099,235 A * 8/2000 Cain .................... E02F 9/26
33/710
7,456,943 B1 * 11/2008 Goad ................... G01C 15/002
356/3.01
(Continued)

FOREIGN PATENT DOCUMENTS

EP 3 450 637 A1 3/2019
JP 2002325143 A * 11/2002 ............... E02F 9/26
(Continued)

OTHER PUBLICATIONS

Hemisphere, Compact GPS Positioning and Heading Smart Antenna, Jun. 2019, Hemisphere GNSS, Inc. (Year: 2019).*
(Continued)

*Primary Examiner* — Russell Frejd
*Assistant Examiner* — Sara J Lewandroski
(74) *Attorney, Agent, or Firm* — Kilpatrick Townsend & Stockton LLP (57) ABSTRACT

A system for tracking a position of a working edge on an implement of a construction vehicle includes a GNSS with an antenna. The GNSS unit is configured to determine a position of the antenna and a tilt and a heading of the GNSS unit. A mount is configured to couple the GNSS unit to a rigid member of the construction vehicle. The mount is configured to couple the GNSS unit to the rigid member so that the antenna is arranged in a known spatial relationship with a pivot point between the rigid member and the implement. A mobile controller is configured for wireless communications with the GNSS unit and an angle sensor that is configured to determine rotation of the implement. The mobile controller is configured to receive the position of the antenna, the tilt, and the heading from the GNSS unit, to receive the rotation of the implement from the angle sensor, (Continued)

and to determine coordinates of the working edge of the implement in a real world coordinate frame.

23 Claims, 5 Drawing Sheets

(51) Int. Cl.
    *G01S 19/47*     (2010.01)
    *E02F 3/32*     (2006.01)
    *E02F 3/34*     (2006.01)

(56) References Cited

U.S. PATENT DOCUMENTS

| | | | | |
|---|---|---|---|---|
| 10,860,016 | B1* | 12/2020 | Wang | E02F 9/2054 |
| 2001/0023766 | A1* | 9/2001 | Ohtomo | G05D 1/0272 |
| | | | | 701/50 |
| 2002/0027007 | A1* | 3/2002 | Ohtomo | G01C 15/004 |
| | | | | 172/2 |
| 2004/0125365 | A1* | 7/2004 | Ohtomo | G01S 19/43 |
| | | | | 356/141.5 |
| 2005/0212702 | A1* | 9/2005 | Brabec | G01S 19/14 |
| | | | | 342/357.57 |
| 2005/0274879 | A1* | 12/2005 | Osaragi | G01C 15/002 |
| | | | | 250/231.13 |
| 2006/0218806 | A1* | 10/2006 | Lyle | G01C 15/08 |
| | | | | 33/295 |
| 2006/0271298 | A1* | 11/2006 | MacIntosh | G01C 15/00 |
| | | | | 702/5 |
| 2007/0290015 | A1* | 12/2007 | Rux | B60R 9/00 |
| | | | | 224/555 |
| 2009/0069987 | A1* | 3/2009 | Omelchenko | E02F 9/2045 |
| | | | | 701/50 |
| 2009/0162177 | A1* | 6/2009 | Nichols | E02F 3/431 |
| | | | | 172/4.5 |
| 2010/0315286 | A1* | 12/2010 | Cerniar | G01C 25/00 |
| | | | | 700/251 |
| 2014/0133947 | A1* | 5/2014 | Nishimura | E02F 9/163 |
| | | | | 414/687 |
| 2014/0146167 | A1* | 5/2014 | Friend | G05D 1/0225 |
| | | | | 348/118 |
| 2014/0168009 | A1* | 6/2014 | Peake | E02F 9/264 |
| | | | | 342/357.34 |
| 2020/0293059 | A1* | 9/2020 | Wang | G06V 10/764 |

FOREIGN PATENT DOCUMENTS

| | | | | |
|---|---|---|---|---|
| JP | 20020325143 A | * | 11/2002 | E02F 9/20 |
| WO | 2012/028916 A1 | | 3/2012 | |

OTHER PUBLICATIONS

Extended European Search Report for Application No. 21156879.5-1016, dated Aug. 6, 2021, 8 pages.

* cited by examiner

TRACKING A POSITION OF A WORKING EDGE ON AN IMPLEMENT OF A CONSTRUCTION VEHICLE

FIELD

This application is broadly directed to tracking a position of a working edge on an implement of a construction vehicle, and some embodiments are more specifically directed to tracking a cutting edge of a bucket or blade of a construction vehicle such as an excavator or skidsteer.

BACKGROUND

Construction vehicles, such as loaders, diggers, graders, and the like, typically utilize hydraulically controlled implements, such as blades or buckets, to move or pick up dirt and other materials. Sometimes these vehicles include various types of sensors to track a position of a working edge of the implement. As an example, an excavator may include multiple global navigation satellite system (GNSS) units on a cab to determine location and heading of the excavator, as well as angle sensors on the boom, stick, and bucket to track a position of a cutting edge of the bucket. The sensors enable machine control of the construction vehicle to improve quality and efficiency. Despite the benefits of these systems, improvements are constantly sought to simplify hardware, improve accuracy, and reduce costs.

SUMMARY

Embodiments of the present disclosure include improved systems for tracking a working edge on an implement of a construction vehicle. Some embodiments use a survey pole with a GNSS receiver that is configured to provide tilt compensation. The survey pole is coupled to a rigid member of the construction vehicle, where the rigid member is coupled to the implement at a pivot point. Other embodiments include a mount on the rigid member, and the GNSS receiver is coupled to the mount. The GNSS receiver can be used to track a position of the pivot point and a heading of the rigid member. An angle sensor coupled to the implement can provide rotation information that allows coordinates of a working edge of the implement to be determined.

In accordance with a specific embodiment, a system for tracking a position of a cutting edge on a bucket of an excavator, the bucket coupled to the excavator at a pivot point between a stick of the excavator and the bucket, a hydraulic mechanism coupled to the stick and configured to provide rotational movement of the bucket, an inertial measurement unit (IMU) coupled to the bucket and configured to determine rotation of the bucket, the system includes a survey pole coupled to the stick; a GNSS unit coupled to the survey pole, the survey pole arranged relative to the stick so that the GNSS unit remains free from contact with any part of the excavator, the bucket, or the stick during a full range of motion of the stick, the GNSS unit including an antenna arranged in a known spatial relationship with the pivot point between the stick of the excavator and the bucket, the GNSS unit configured to determine a position of the antenna and a tilt and a heading of the GNSS unit; and a mobile controller configured for wireless communications with the GNSS unit and the IMU, the mobile controller configured to receive the position of the antenna, the tilt, and the heading from the GNSS unit, and to receive the rotation of the bucket from the IMU, the mobile controller configured to determine coordinates of the cutting edge of the bucket in a real world coordinate frame.

In an embodiment, the survey pole includes an upper portion of a grade rod that has been removably detached from a lower portion of the grade rod and the survey pole does not include a tip.

In another embodiment, the GNSS unit includes a GNSS receiver.

In yet another embodiment, the mobile controller is a cell phone.

In accordance with another embodiment, a system for tracking a position of a cutting edge on a bucket of a skidsteer, the bucket coupled to the skidsteer at a pivot point between arms of the skidsteer and the bucket, a hydraulic mechanism coupled to the arms and configured to provide rotational movement of the bucket, an IMU coupled to the bucket and configured to determine rotation of the bucket, the system includes a survey pole coupled to one of the arms of the skidsteer; a GNSS unit coupled to the survey pole, the survey pole arranged relative to the arms of the skidsteer so that the GNSS unit remains free from contact with any part of the skidsteer, the bucket, or the arms during a full range of motion of the arms, the GNSS unit including an antenna arranged in a known spatial relationship with the pivot point between the arms of the skidsteer and the bucket, the GNSS unit configured to determine a position of the antenna and a tilt and a heading of the GNSS unit; and a mobile controller configured for wireless communications with the GNSS unit and the IMU, the mobile controller configured to receive the position of the antenna, the tilt, and the heading from the GNSS unit, and to receive the rotation of the bucket from the IMU, the mobile controller configured to determine coordinates of the cutting edge of the bucket in a real world coordinate frame.

In accordance with another embodiment, a system for tracking a position of a working edge on an implement of a construction vehicle, the implement coupled to the construction vehicle at a pivot point between a rigid member of the construction vehicle and the implement, a hydraulic mechanism coupled to the rigid member and configured to provide rotational movement of the implement, an angle sensor coupled to the implement and configured to determine rotation of the implement, the system includes a GNSS unit coupled to a mount on the rigid member, the mount arranged relative to the rigid member so that the GNSS unit remains free from contact with any part of the construction vehicle, the implement, or the rigid member during a full range of motion of the rigid member, the GNSS unit arranged in a known spatial relationship with the pivot point between the rigid member of the construction vehicle and the implement, the GNSS unit configured to determine a position, a tilt, and a heading of the GNSS unit; and a mobile controller configured for wireless communications with the GNSS unit and the angle sensor, the mobile controller configured to receive the position, the tilt, and the heading from the GNSS unit, and to receive the rotation of the implement from the angle sensor, the mobile controller configured to determine coordinates of the working edge of the implement in a real world coordinate frame.

In some embodiments, the construction vehicle may be an excavator, while in other embodiments, the construction vehicle may be a skidsteer. The implement may be a bucket, and the rigid member may include a stick of an excavator or arms of a skidsteer. The angle sensor may include an IMU.

In an embodiment, the system also includes a survey pole coupled to the mount, wherein the GNSS unit is coupled to the survey pole.

In accordance with yet another embodiment, a system for tracking a position of a working edge on an implement of a construction vehicle includes a GNSS unit including an antenna, the GNSS unit configured to determine a position of the antenna and a tilt and a heading of the GNSS unit; a mount configured to couple the GNSS unit to a rigid member of the construction vehicle, the rigid member coupling the implement to the construction vehicle and the rigid member coupled to the implement at a pivot point between the rigid member and the implement, the mount configured to couple the GNSS unit to the rigid member so that the antenna is arranged in a known spatial relationship with the pivot point between the rigid member and the implement; and a mobile controller configured for wireless communications with the GNSS unit and an angle sensor, the angle sensor configured to determine rotation of the implement, the mobile controller configured to receive the position of the antenna, the tilt, and the heading from the GNSS unit, and to receive the rotation of the implement from the angle sensor, the mobile controller configured to determine coordinates of the working edge of the implement in a real world coordinate frame.

In an embodiment, the system also includes a survey pole, wherein the mount is a mounting mechanism configured so that the survey pole can be rigidly attached to the mounting mechanism and so that the survey pole can be detached from the mounting mechanism, and wherein the mounting mechanism is configured so that when the survey pole is attached to the mounting mechanism, the antenna of the GNSS unit is arranged in approximately the known spatial relationship with the pivot point between the rigid member and the implement.

Numerous benefits are achieved using embodiments described herein over conventional systems. Some embodiments, for example, simplify hardware requirements for tracking a position of a working edge on an implement of a construction vehicle. Conventional systems require multiple GNSS units and multiple angle sensors, whereas some embodiments need only a single GNSS unit and a single angle sensor. This reduces the components that are subject to damage and wear. The GNSS unit is used to measure position and heading of the construction vehicle, and the GNSS unit can be used with a survey pole for other purposes such as standard stake-out operations. This reduces duplication of equipment and also reduces costs. Depending on the embodiment, one or more of these features and/or benefits may exist.

BRIEF DESCRIPTION OF THE DRAWINGS

The accompanying drawings, which are included to provide a further understanding of the embodiments described herein, are incorporated in and constitute a part of this specification, illustrate various embodiments, and together with the detailed description, serve to explain some principles of operation. No attempt is made to show structural features in more detail than may be necessary for a fundamental understanding of the various embodiments and ways in which they may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present disclosure include systems for tracking a working edge on an implement of a construction vehicle. As an example, some embodiments track a cutting edge on a bucket of an excavator. A survey pole with a GNSS receiver is configured to provide positioning and tilt compensation. The survey pole is coupled to a stick of the excavator in some embodiments, while in other embodiments the GNSS receiver is coupled directly to a mount on the stick. The GNSS receiver can be used to track a position of a pivot point between the stick and the bucket and a heading of the stick. An angle sensor coupled to the bucket can provide rotation information that allows coordinates of the cutting edge to be determined.

An excavator and skidsteer are used herein as exemplary construction vehicles. Embodiments of the present disclosure can also be used with other types of construction vehicles. For example, the systems described herein can be implemented with other diggers that include sticks, other loaders that include arms, as well as dozers, graders, and similar construction vehicles that include frames (e.g., C-Frames). One of ordinary skill in the art would understand how to implement the features on other construction vehicles based on the examples provided herein.

Also, a bucket and blade are used herein as exemplary implements that may be coupled to construction vehicles. Embodiments of the present disclosure can also be used with other types of implements that are permanently or removably coupled to construction vehicles. For example, the systems described herein can be implemented with any of the numerous types of implements that can be coupled to construction vehicles. Additionally, the systems described herein can be used to track the position of any particular part of the implement. The working edge is used herein to refer specifically, for example, to a cutting edge of a bucket or blade, or generally to a particular part or point on the implement. In some embodiments, the working edge refers to a particular part of the implement whose position is tracked and used for machine control.

Figure 1A:
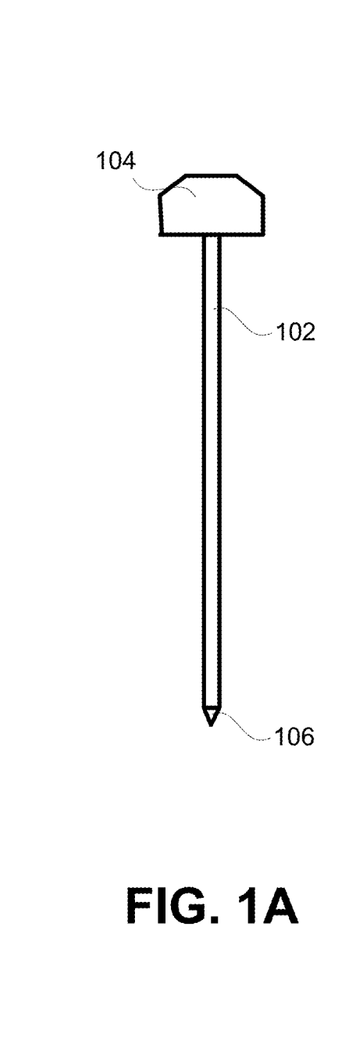
FIGS. 1A-1C are simplified drawings of a GNSS unit and conventional survey poles or grade rods.
Figure 1B:
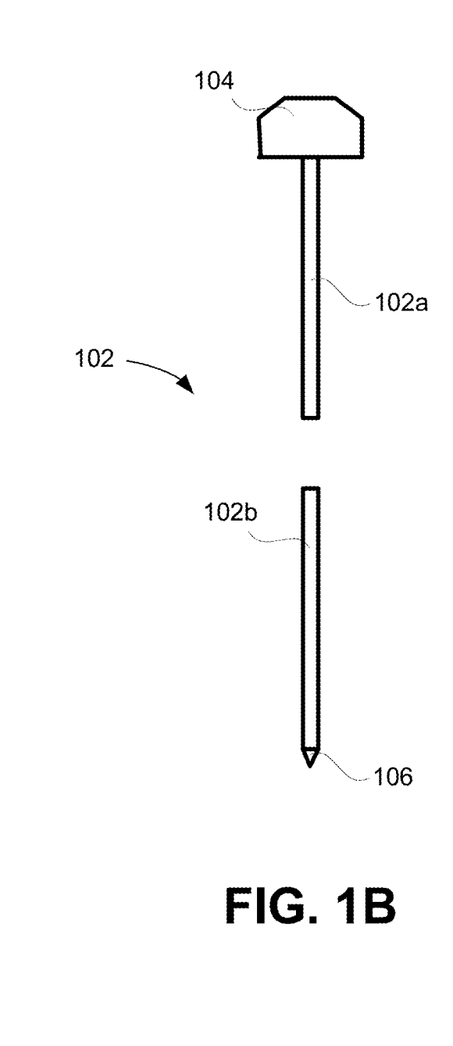
Figure 1C:
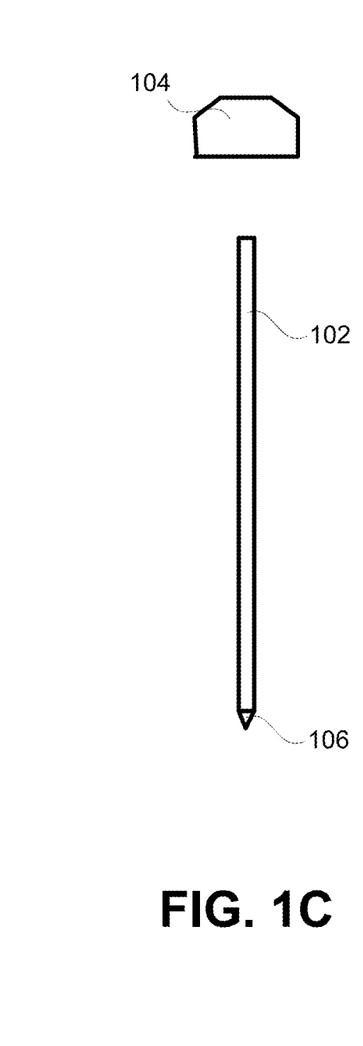

FIGS. 1A-1C are simplified drawings of a GNSS unit 104 and conventional survey poles or grade rods 102. The GNSS unit 104 and survey pole 102 may be a conventional GNSS rover. In FIG. 1A, the survey pole 102 is a single piece that extends between the GNSS unit 104 and a tip 106.

In FIG. 1B, the survey pole 102 includes a top portion 102a that is detached from a bottom portion 102b. The top and bottom portions 102a, 102b may include threads or other conventional attachment means that allow the top portion 102a to be attached to the bottom portion 102b. The GNSS unit 104 and tip 106 may also be removably attached to the survey pole 102.

In FIG. 1C, the GNSS unit 104 is detached from the survey pole 102. The GNSS unit 104 and/or the survey pole 102 may include threads or other conventional attachment means that allow the GNSS unit 104 to be attached to and removed from the survey pole 102.

FIGS. 1A-1C provide examples of single piece and multi-piece survey poles. Other survey pole configurations exist including telescoping poles and multi-leg poles such as tripods. The embodiments described herein are not limited to a particular type of survey pole and may be implemented with any survey pole including the single piece survey pole shown in FIGS. 1A and 1C, as well as the multi-piece survey pole shown in FIG. 1B.

The GNSS unit 104 includes an antenna for receiving GNSS signals and a receiver for processing the signals and determining position information. In some embodiments, a remote computing device (e.g., a cell phone or mobile controller) may perform part of the processing. Thus, when the GNSS unit is described herein as determining a position or position information, it should be appreciated that the GNSS signals are received by the antenna and at least some of the processing is performed by the receiver. A part of the processing may be performed by another computing device.

The GNSS unit 104 may include a radio, modem, or other means for wireless communications. As examples, the GNSS unit 104 may be configured to receive GNSS corrections using satellite, radio, WiFi, or other wireless communications. The GNSS unit 104 may also be configured to send partially processed GNSS signals or position information to a computing device such as a mobile controller.

The GNSS unit 104 also includes other sensors to determine tilt and heading information. The position, tilt, and heading information can be determined in accordance with any technique and typically requires an initialization process that may be dependent on the particular device. An example of a GNSS unit 104 that can determine position, tilt, and heading information is the Trimble SPS986 GNSS Smart Antenna. Other GNSS units exist that can also provide this information. The embodiments described herein are not limited to a particular configuration and can be used with any GNSS unit that provides these features.

Figure 2:
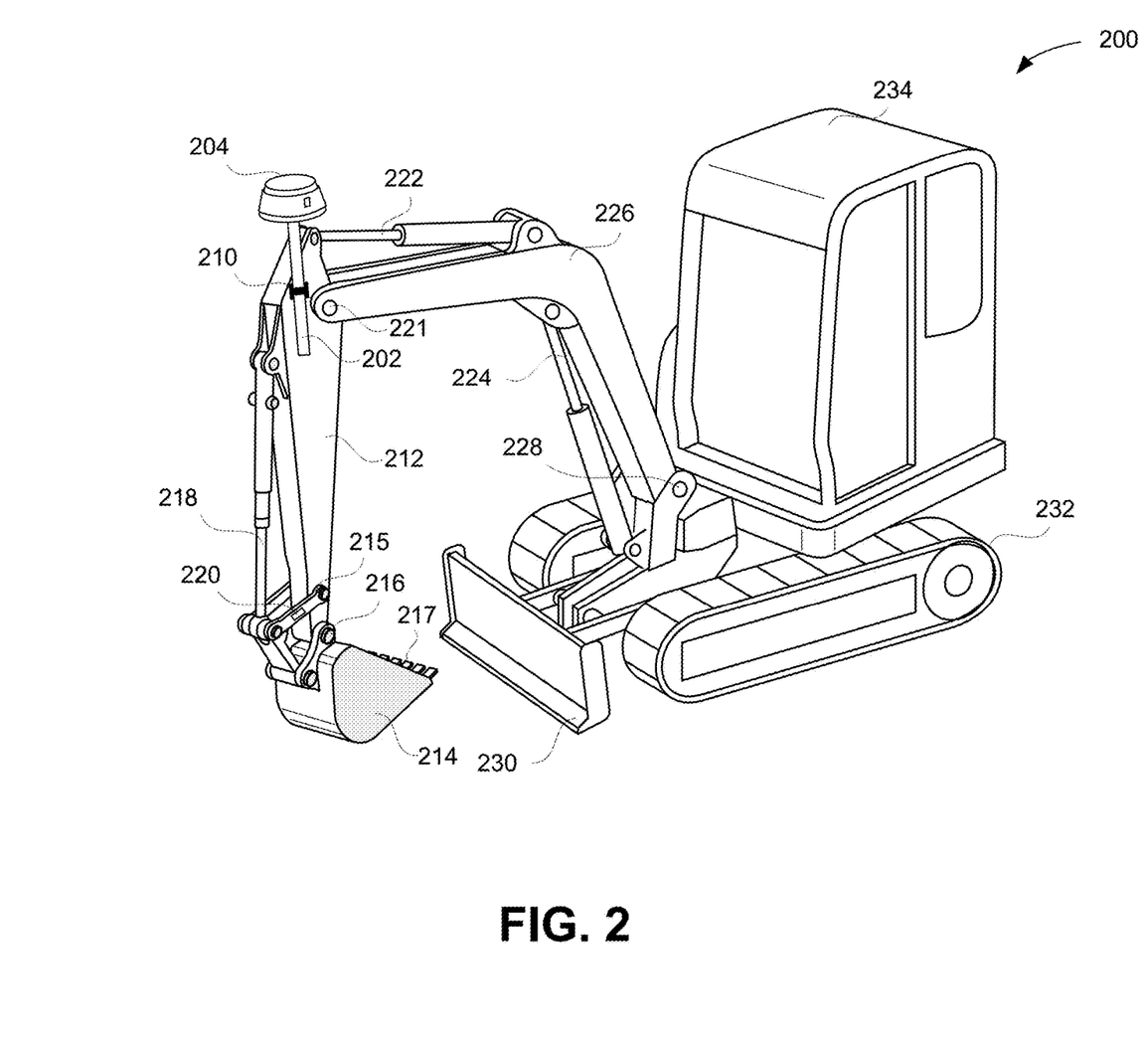
FIG. 2 is a simplified perspective view of an excavator with a GNSS unit in accordance with an embodiment.

FIG. 2 is a simplified perspective view of an excavator 200 with a GNSS unit 204 in accordance with an embodiment. The excavator 200 includes a cab 234 for an operator to control the various functions of the excavator 200 and tracks 232 for tramming the excavator 200 from one location to another. In other embodiments, the excavator may include wheels or other means for providing translational movement rather than the tracks 232. The excavator 200 in this example also includes a blade 230 for moving dirt or debris and for providing stabilization during digging operations.

A boom 226, stick 212, and bucket 214 enable the digging operations. The boom 226 and stick 212 are rigid members that link the bucket 214 to a body of the excavator 200. The boom 226 is coupled to the body at a pivot point 228 and is moved up and down by a hydraulic mechanism 224. The stick 212 is coupled to the boom 226 at a pivot point 221 and is moved in and out by a hydraulic mechanism 222. The bucket 214 is coupled to the stick 212 at a pivot point 216 and is moved (or curled) by a hydraulic mechanism 218. It should be appreciated that each of the parts of the excavator may be coupled directly to each other or may be coupled indirectly by other intermediate linkages.

A survey pole 202 is coupled to the stick 212, and the GNSS unit 204 is coupled to the survey pole 202. The survey pole 202 may be arranged relative to the stick 212 so that the GNSS unit 204 remains free from contact with any part of the excavator 200, including the boom 226 and the stick 212, during a full range of motion of the boom 226, the stick 212, and/or the bucket 214. The GNSS unit 204 includes an antenna for receiving GNSS signals and is configured to determine a three-dimensional position (or coordinates) of the antenna in a real world coordinate frame. The GNSS unit 204 also includes other sensors for determining a tilt and heading of the survey pole 202 in the real world coordinate frame.

In this example, the survey pole 202 is coupled to the stick 212 using a mounting mechanism 210. The GNSS unit 204 is arranged in a known spatial relationship with the pivot point 216 between the stick 212 and the bucket 214. Because the GNSS unit 204 is arranged in a known spatial relationship with the pivot point 216, coordinates of the pivot point 216 can be determined in the real world coordinate frame in a manner similar to how a conventional GNSS rover with tilt compensation determines coordinates at a tip of the survey pole. In some embodiments, the survey pole 202 is aligned with the pivot point 216 and the known spatial relationship is a distance between the GNSS unit 204 (or the antenna) and the pivot point 216. In other embodiments, the known spatial relationship may include horizontal and vertical offsets between the GNSS unit 204 (or the antenna) and the pivot point 216.

The survey pole 202 in FIG. 2 does not include a tip like that used for conventional rover measurements. In this example, the survey pole 202 only includes an upper portion similar to the top portion 102a shown in FIG. 1B. This is simply to reduce an overall length so that the survey pole 202 is less likely to be damaged or bumped. A full length survey pole having a tip, including a multi-leg survey pole, may be used with any of the embodiments described herein and an appropriate mounting mechanism.

The mounting mechanism 210 rigidly couples the survey pole 202 to the stick 212. Using the mounting mechanism 210, the survey pole 210 may be removably attached to the stick 212. For example, the survey pole 202 may be attached to the stick 212 for use in tracking a cutting edge 217 of the bucket 214, and the survey pole 202 may be detached from the stick 212 and used to perform conventional GNSS survey measurements.

The mounting mechanism 210 and/or the survey pole 202 may be configured so that the survey pole 202 can be rigidly attached to the mounting mechanism 210, and also so that the survey pole 202 can be detached from the mounting mechanism 210. The mounting mechanism 210 and/or the survey pole 202 may also be configured so that when the survey pole 202 is attached to the mounting mechanism 210, the antenna of the GNSS unit 204 is arranged in approximately the known spatial relationship with the pivot point 216. This allows the survey pole 202 to be detached and re-attached without changing the known spatial relationship between the antenna of the GNSS unit 204 and the pivot point 216. The survey pole 202 may have a notch, mark, mounting receiver, or the like to ensure the survey pole 202 is attached at a same point each time. Alternatively or additionally, the mounting mechanism 210 may be arranged to receive the survey pole 202 at a same point each time. The mounting mechanism 210 and/or the survey pole 202 may also be configured so that when the survey pole 202 is attached to the mounting mechanism 210, an orientation of the GNSS unit 204 relative to the mounting mechanism 210 is approximately the same each time.

An angle sensor 220 is coupled either directly or indirectly to the bucket 214. In this example, the angle sensor 220 is coupled indirectly to the bucket 214 and directly to a part of the linkage 215 that connects the stick 212 to the bucket 214. The angle sensor 220 determines rotation of the bucket 214. Because the bucket 214 is used for digging and other functions, the angle sensor 220 may be mounted on the part of the linkage 215 (e.g., the dog bone) where rotation of the bucket 214 can be determined while protecting the angle sensor 220 from contact with dirt or other materials that may damage the angle sensor 220 and/or impact sensor measurements. The angle sensor 220 may be an inertial measurement unit (IMU) or other sensor configured to determine or track rotation of the bucket 214.

As the bucket 214 rotates (or curls), a distance between the pivot point 216 and the cutting edge 217 of the bucket 214 remains constant so that a spatial relationship between the pivot point 216 and the cutting edge 217 is fixed. Thus, coordinates of the cutting edge 217 can be determined in the real world coordinate frame using the position of the antenna, the tilt and heading of the survey pole 202, the known spatial relationship between the GNSS unit 204 (or antenna) and the pivot point 216, the rotation of the bucket 214, and the spatial relationship between the pivot point 216 and the cutting edge 217.

Using a width of the bucket 214 and a spatial relationship between the cutting edge 217 and the pivot point 216, coordinates of any point along the cutting edge 217 of the bucket 214 can be determined (assuming the bucket 214 does not tilt). If the bucket 214 tilts in addition to curling, a second angle sensor can be used to determine the tilt of the bucket 214 (or the same angle sensor may be used to determine curl and tilt). Using the tilt of the bucket 214 and the spatial relationship between the pivot point 216 and the cutting edge 217, in addition to the position of the antenna, the tilt and heading of the survey pole 202, the known spatial relationship between the GNSS unit 204 (or antenna) and the pivot point 216, and the rotation of the bucket 214, the coordinates of the cutting edge 217 can be determined in the real world coordinate frame.

The coordinates of the cutting edge 217 may be determined using a mobile controller. The mobile controller may be a controller that is normally used in conjunction with the survey pole 202 and GNSS unit 204 or it may be a separate device such as a cell phone. The mobile controller may be configured for wireless communications with the GNSS unit 204 and the angle sensor 220. The mobile controller receives the position of the antenna, the tilt, and the heading from the GNSS unit 204, and the mobile controller receives the rotation of the bucket 214 from the angle sensor 220. The mobile controller may also receive or have in memory the known spatial relationship between the GNSS unit 204 (or antenna) and the pivot point 216, the distance between the pivot point 216 and the cutting edge 217 of the bucket 214, the width of the cutting edge 217 of the bucket 214; and or a spatial relationship between the cutting edge 217 and the pivot point 216.

The excavator 200 shown in FIG. 2 is used merely as an example of a construction vehicle that includes a rigid member (e.g., the stick 212) coupled to an implement (e.g., the bucket 214) at a pivot point. Other excavators having different configurations may be used with the embodiments described herein. For example, the embodiment described with regard to FIG. 2 may be used with backhoes or more complex construction vehicles such as multi-piece boom excavators, offset boom excavators, swing boom excavators, and the like. The embodiments described herein can simplify tracking of a working edge of an implement on complex construction vehicles by reducing a number of sensors and eliminating the need to track a position or orientation of the boom. With more complex construction vehicles, the survey pole may be coupled to the last rigid member that is coupled either directly or indirectly to the implement.

Figure 3:
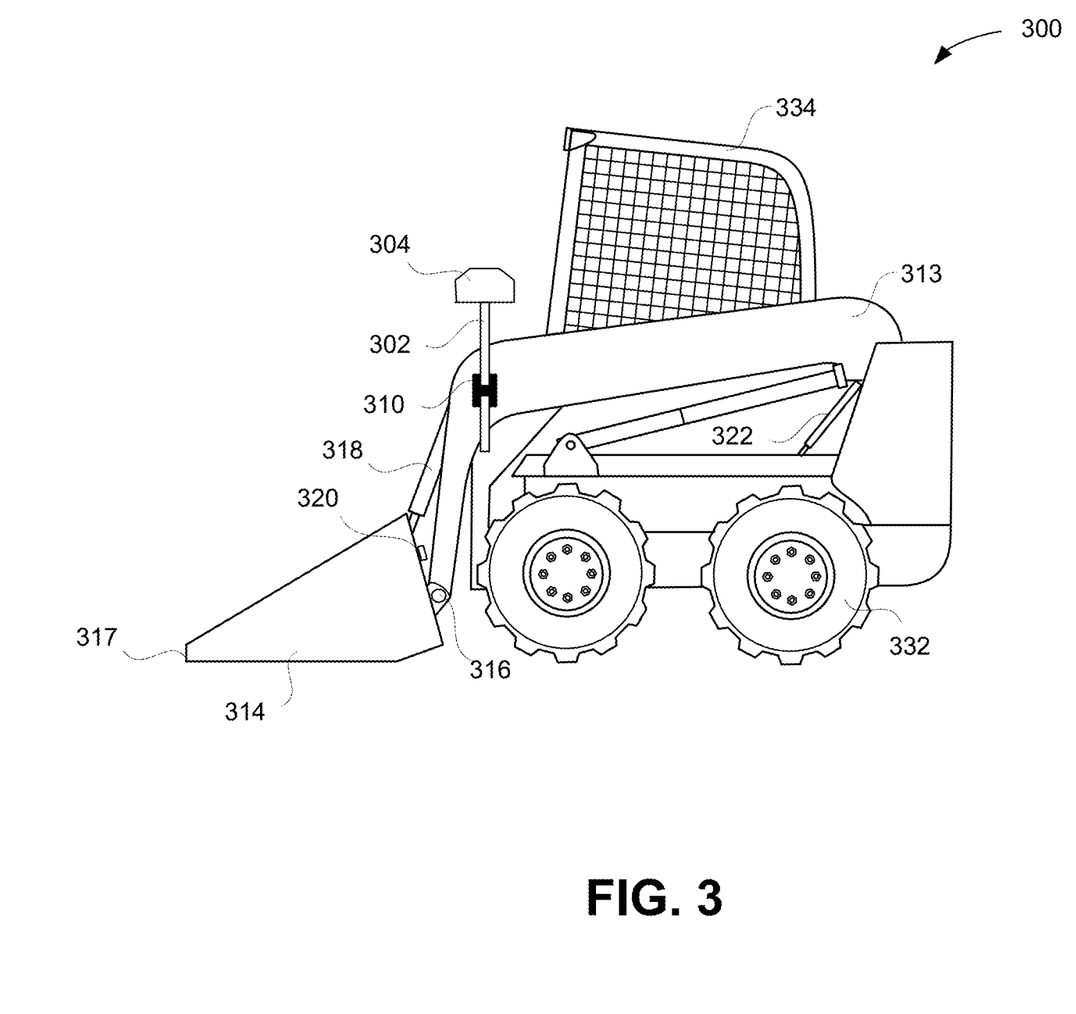
FIG. 3 is a simplified side view of a skidsteer with a GNSS unit in accordance with an embodiment.

FIG. 3 is a simplified side view of a skidsteer 300 with a GNSS unit 304 in accordance with an embodiment. The skidsteer 300 includes a cab 334 for an operator to control the various functions of the skidsteer 300 and wheels 332 for providing translational movement of the skidsteer 300. In other embodiments, the skidsteer may include tracks or other means for providing translational movement.

Arms 313 (only one is shown in the side view) enable movement of bucket 314. The arms 313 are rigid members that link the bucket 314 to a body of the skidsteer 300. The arms 313 are coupled to the body of the skidsteer 300 at a pivot point (not shown) and are moved up and down by a hydraulic mechanism (not shown). The bucket 314 is coupled to the arms 313 at a pivot point 316 and is moved (or curled) by a hydraulic mechanism 318.

A survey pole 302 is coupled to one of the arms 313, and the GNSS unit 304 is coupled to the survey pole 302. The survey pole 302 may be arranged relative to the arms 313 so that the GNSS unit 304 remains free from contact with any part of the skidsteer 300, including the arms 313 and the bucket 314, during a full range of motion of the arms 313 and/or the bucket 314. The GNSS unit 304 includes an antenna for receiving GNSS signals and is configured to determine a three-dimensional position (or coordinates) of the antenna in a real world coordinate frame. The GNSS unit 304 also includes other sensors for determining a tilt and heading of the survey pole 302 in the real world coordinate frame.

In this example, the survey pole 302 is coupled to one of the arms 313 using a mounting mechanism 310. The GNSS unit 304 is arranged in a known spatial relationship with the pivot point 316 between the arms 313 and the bucket 314. Because the GNSS unit 304 is arranged in a known spatial relationship with the pivot point 316, coordinates of the pivot point 316 can be determined in the real world coordinate frame in a manner similar to how a conventional GNSS rover with tilt compensation determines coordinates at a tip of the survey pole. In some embodiments, the survey pole 202 is aligned with the pivot point 316 and the known spatial relationship is a distance between the GNSS unit 304 (or the antenna) and the pivot point 316. In other embodiments, like the example shown in FIG. 3, the known spatial relationship may include horizontal and vertical offsets between the GNSS unit 304 (or the antenna) and the pivot point 316.

Similar to the example shown in FIG. 2, the survey pole 302 in FIG. 3 does not include a tip like that used for conventional rover measurements. Instead, the survey pole 302 only includes an upper portion similar to the top portion 102a shown in FIG. 1B. A full length survey pole having a tip, including a multi-leg survey pole, may be used with any of the embodiments described herein.

The mounting mechanism 310 rigidly couples the survey pole 302 to one of the arms 313. Using the mounting mechanism 310, the survey pole 302 may be removably attached to the arm. For example, the survey pole 302 may be attached to one of the arms 313 for use in tracking a cutting edge 317 of the bucket 314, and the survey pole 302 may be detached from the skidsteer 300 and used to perform conventional GNSS survey measurements. The mounting mechanism 310 and/or the survey pole 302 may be configured as described above with regard to FIG. 2 so that the known spatial relationship between the GNSS unit 304 and the pivot point 316 is substantially the same each time the survey pole 302 is coupled to the skidsteer 300.

An angle sensor 320 is coupled either directly or indirectly to the bucket 314. In this example, the angle sensor 320 is coupled to a backside of the bucket 314 where it is protected from contact with dirt or other materials that may damage the angle sensor 320 and/or impact sensor measurements. The angle sensor 320 determines rotation of the bucket 314. The angle sensor 320 may be an IMU or other sensor configured to determine rotation of the bucket 314.

As the bucket 314 rotates (or curls), a distance between the pivot point 316 and the cutting edge 317 of the bucket 314 remains constant so that a spatial relationship between the pivot point 316 and the cutting edge 317 is fixed. Thus, coordinates of the cutting edge 317 can be determined in the real world coordinate frame using the position of the antenna, the tilt and heading of the survey pole 302, the known spatial relationship between the GNSS unit 304 (or antenna) and the pivot point 316, the rotation of the bucket 314, and the spatial relationship between the pivot point 316 and the cutting edge 317.

Using a width of the bucket 314 and a spatial relationship between the cutting edge 317 and the pivot point 316, coordinates of any point along the cutting edge 317 of the bucket 314 can be determined (assuming the bucket 314 does not tilt). If the bucket 314 tilts in addition to curling, a second angle sensor can be used to determine the tilt of the bucket 314 (or the same angle sensor may be used to determine curl and tilt). Using the tilt of the bucket 314 and the spatial relationship between the pivot point 316 and the cutting edge 317, in addition to the position of the antenna, the tilt and heading of the survey pole 302, the known spatial relationship between the GNSS unit 304 (or antenna) and the pivot point 316, and the rotation of the bucket 314, the coordinates of the cutting edge 317 can be determined in the real world coordinate frame. The coordinates may be determined using a mobile controller as described previously with regard to the example of FIG. 2.

The skidsteer 300 shown in FIG. 3 is used merely as an example of a construction vehicle that includes rigid members (e.g., the arms 313) coupled to an implement (e.g., the bucket 314) at a pivot point. Other loaders having arms, or dozers or graders having frames, may be used in a similar manner with the embodiments described herein.

Figure 4:
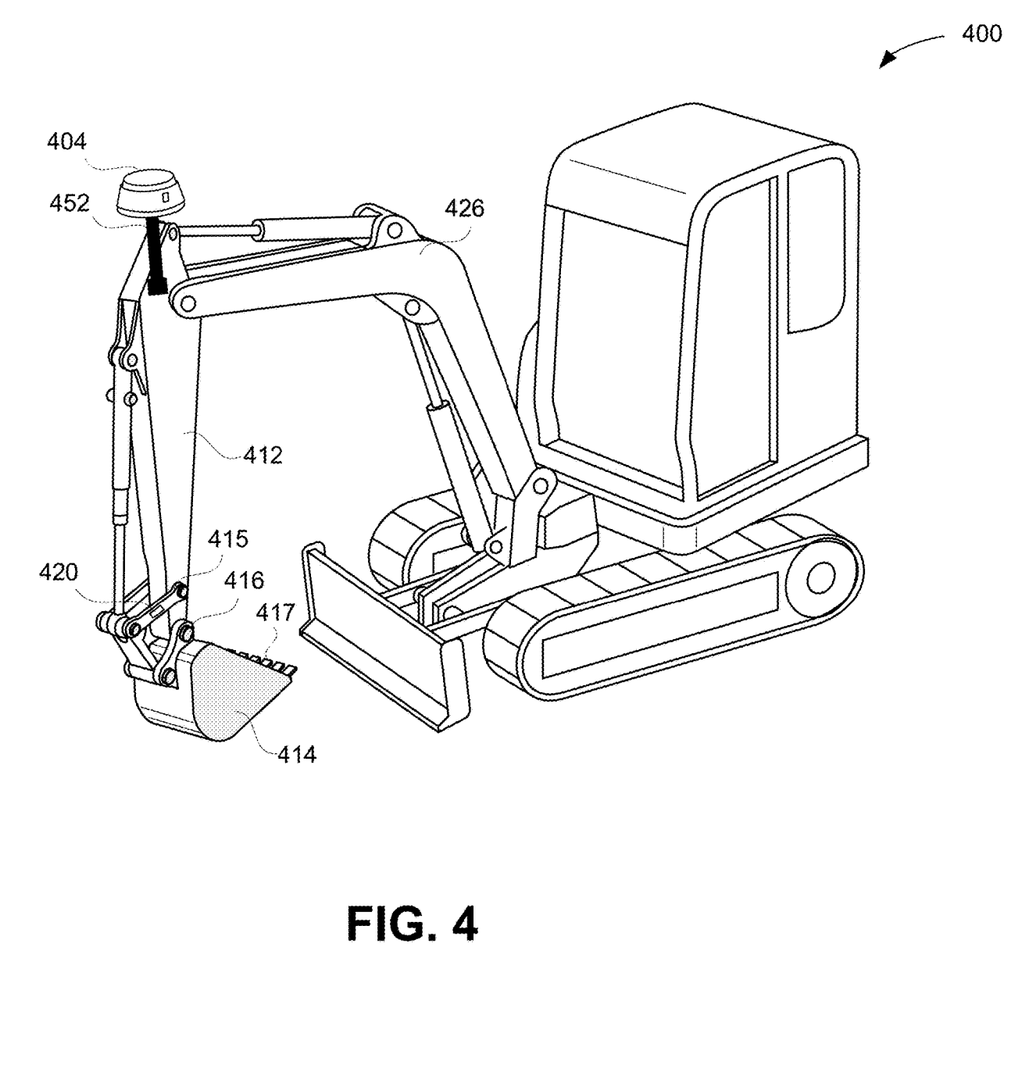
FIG. 4 is a simplified perspective view of an excavator with a GNSS unit in accordance with another embodiment.

FIG. 4 is a simplified perspective view of an excavator 400 with a GNSS unit 404 in accordance with another embodiment. The excavator 400 is similar to the excavator 200 shown in FIG. 2, and a description of the various features can be found in the description of FIG. 2. In this example, the GNSS unit 404 is coupled to a mount 452 on a stick 412 of the excavator 400. The mount 452 may be permanently or removably attached to the stick 412. The GNSS unit 404 and the mount 452 may include threads or other attachment means for coupling the GNSS unit 404 to the mount 452.

The mount 452 may be arranged relative to the stick 412 so that the GNSS unit 404 remains free from contact with any part of the excavator 400, including a boom 426 and the stick 412, during a full range of motion of the boom 426, the stick 412, and/or a bucket 414. The GNSS unit 404 includes an antenna for receiving GNSS signals and is configured to determine a three-dimensional position (or coordinates) of the antenna in a real world coordinate frame. The GNSS unit 404 also includes other sensors for determining a tilt and heading of the GNSS unit 404 in the real world coordinate frame.

The GNSS unit 404 is arranged in a known spatial relationship with the pivot point 416 between the stick 412 and the bucket 414. Because the GNSS unit 404 is arranged in a known spatial relationship with the pivot point 416, coordinates of the pivot point 416 can be determined in the real world coordinate frame in a manner similar to how a conventional GNSS rover with tilt compensation determines coordinates at a tip of the survey pole. The known spatial relationship may include horizontal and/or vertical offsets between the GNSS unit 404 (or the antenna) and the pivot point 416.

The mount 452 rigidly couples the GNSS unit 404 to the stick 412. Using the mount 452, the GNSS unit 404 may be removably attached to the stick 412. For example, the GNSS unit 404 may be attached to the stick 412 for use in tracking a cutting edge 417 of the bucket 414, and the GNSS unit 404 may be detached from the stick 412 and used with a survey pole to perform conventional GNSS survey measurements.

The mount 452 may be configured so that when the GNSS unit 404 is attached to the mount 452, the antenna of the GNSS unit 404 is arranged in approximately the known spatial relationship with the pivot point 416. This allows the GNSS unit 404 to be detached and re-attached without changing the known spatial relationship between the antenna of the GNSS unit 404 and the pivot point 416. The mount 452 and/or the GNSS unit 404 may also be configured so that when the GNSS unit 404 is attached to the mount 452, an orientation of the GNSS unit 404 relative to the mount 452 is approximately the same each time.

An angle sensor 420 is coupled either directly or indirectly to the bucket 414 similar to the arrangement described with regard to FIG. 2. The angle sensor 420 may be an IMU or other sensor configured to determine or track rotation of the bucket 414.

As described above with regard to FIG. 2, coordinates of the cutting edge 417 of the bucket 414 can be determined in the real world coordinate frame. In some embodiments, the coordinates of the cutting edge 417 are determined using the position of the antenna, the tilt and heading of the GNSS unit 404, the known spatial relationship between the GNSS unit 404 (or antenna) and the pivot point 416, the rotation of the bucket 414, and a spatial relationship between the pivot point 416 and the cutting edge 417. Using a width of the bucket 414 and the spatial relationship between the cutting edge 417 and the pivot point 416, coordinates of any point along the cutting edge 417 of the bucket 414 can be determined. Additional angle sensors can be used to account for tilt of the bucket 414 if necessary based on the configuration of the excavator 400. The coordinates of the cutting edge 417 may be determined using a mobile controller as described previously.

The excavator 400 shown in FIG. 4 is used merely as an example of a construction vehicle that includes a rigid member (e.g., the stick 412) coupled to an implement (e.g., the bucket 414) at a pivot point. This example includes a mount 452 for the GNSS unit 404. Other excavators having different configurations may be used with the embodiments described herein. For example, the embodiment described with regard to FIG. 4 may be used with skidsteers, backhoes, or with more complex construction vehicles such as multi-piece boom excavators, offset boom excavators, swing boom excavators, and the like. The embodiments described herein can simplify tracking of a working edge of an implement on complex construction vehicles by reducing a number of sensors and eliminating the need to track position or orientation of the boom. With more complex construction vehicles, the GNSS unit may be coupled to a mount on the last rigid member that is coupled either directly or indirectly to the implement.

Figure 5:
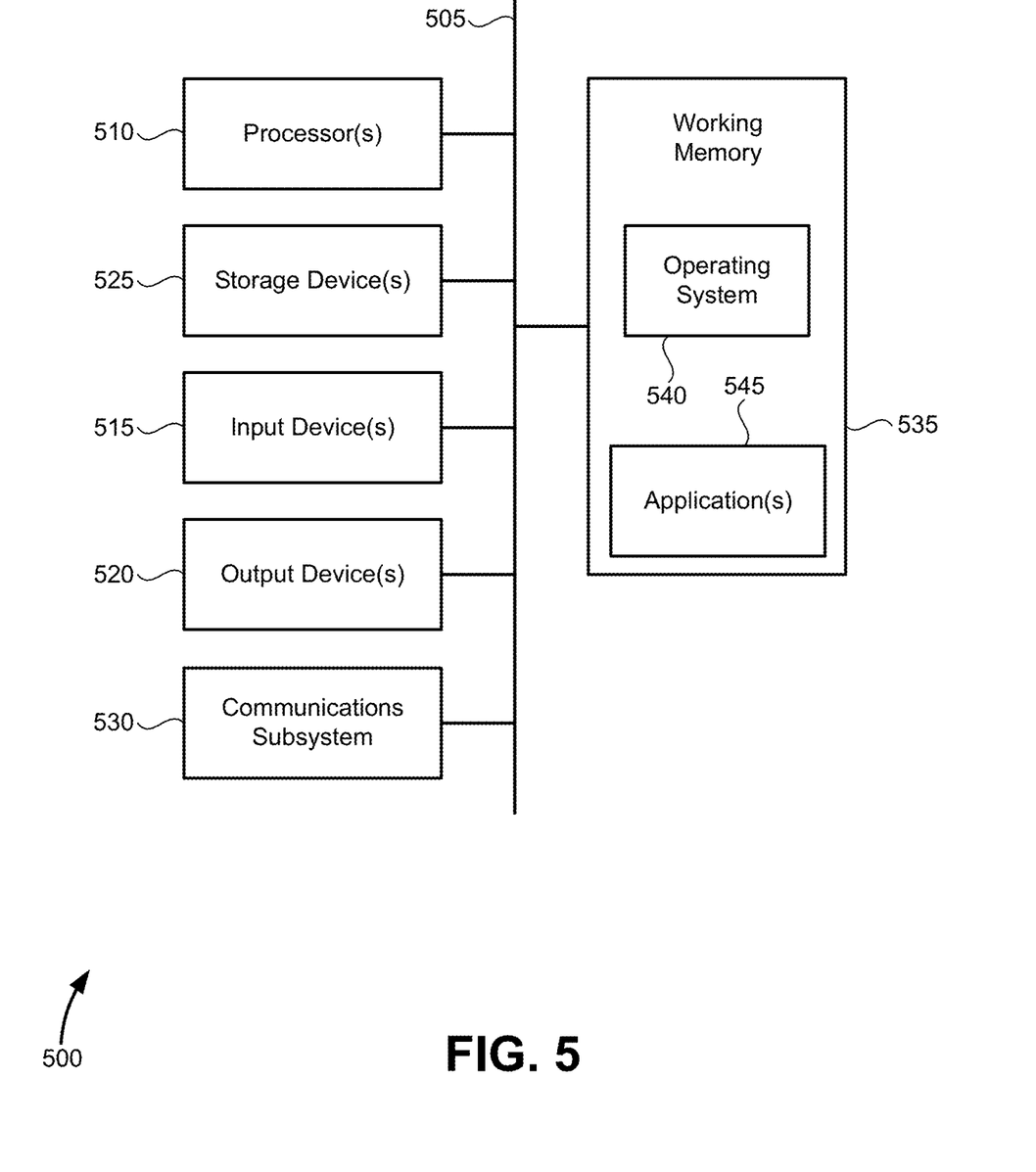
FIG. 5 is a simplified block diagram of a mobile controller in accordance with an embodiment.

FIG. 5 is a simplified block diagram of a mobile controller 500 in accordance with an embodiment. The mobile controller 500 in this example includes a communications subsystem 530 that allows communications with a GNSS unit and one or more angle sensors. The mobile controller 500 also includes one or more processors 510 for determining a position of a working edge of an implement. The mobile controller 500 may also include working memory 535 with instructions that when executed by the one or more processors 510 provide an operating system 540 and applications 545 that facilitate determining the position of the working edge.

The mobile controller 500 in FIG. 5 is provided merely as an example. Other mobile controllers having different configurations may be used with the embodiments described herein. The mobile controller 500 illustrated in FIG. 5 may be incorporated into devices such as a portable electronic device, cell phone, or other computing devices. FIG. 5 provides a schematic illustration of one embodiment of a mobile controller 500 that can perform some or all of the steps of the methods provided by various embodiments. It should be noted that FIG. 5 is meant only to provide a generalized illustration of various components, any or all of which may be utilized as appropriate.

The mobile controller 500 is shown comprising physical or functional elements that can be electrically coupled via a bus 505, or may otherwise be in communication, as appropriate. The hardware elements may include one or more processors 510, including without limitation one or more general-purpose processors and/or one or more special-purpose processors such as digital signal processing chips, graphics acceleration processors, and/or the like; one or more input devices 515, which can include, without limitation a mouse, a keyboard, a camera, and/or the like; and one or more output devices 520, which can include, without limitation a display device, a printer, and/or the like.

The mobile controller 500 may further include and/or be in communication with one or more non-transitory storage devices 525, which may comprise, without limitation, local and/or network accessible storage. Such storage devices may be configured to implement any appropriate data stores, including without limitation, various file systems, database structures, and/or the like.

The mobile controller 500 might also include a communications subsystem 530, which can include, without limitation, a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 530 may include one or more input and/or output communication interfaces to permit data to be exchanged with other devices such as a GNSS unit and angle sensor. In some embodiments, the mobile controller 500 may further comprise a working memory 535.

The mobile controller 500 can also include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a processor. In an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 525. In some cases, the storage medium might be incorporated within a computer system, such as the mobile controller 500. In other embodiments, the storage medium might be separate, e.g., a removable medium. These instructions might take the form of executable code, which is executable by the mobile controller 500 and/or might take the form of source and/or installable code, which, upon compilation and/or installation on the mobile controller 500, e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ the mobile controller 500 to perform methods in accordance with various embodiments. According to a set of embodiments, some or all of the procedures of such methods are performed by the mobile controller 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the mobile controller 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques may have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

What is claimed is:

1. A system for tracking a position of a cutting edge on a bucket of an excavator, the bucket coupled to the excavator at a pivot point between a stick of the excavator and the bucket, a hydraulic mechanism coupled to the stick and configured to provide rotational movement of the bucket, an inertial measurement unit (IMU) coupled to the bucket and configured to determine rotation of the bucket, the system comprising:
   a survey pole coupled to a side of the stick using a mounting mechanism, the mounting mechanism removably attached to a middle portion of the survey pole so that a first portion of the survey pole extends beyond a top of the mounting mechanism and a second portion of the survey pole extends beyond a bottom of the mounting mechanism;
   a global navigation satellite system (GNSS) unit coupled to the first portion of the survey pole, the survey pole arranged relative to the stick so that the GNSS unit remains free from contact with any part of the excavator, the bucket, or the stick during a full range of motion of the stick, the GNSS unit including an antenna arranged in a known spatial relationship with the pivot point between the stick of the excavator and the bucket, the GNSS unit configured to determine a position of the antenna and a tilt and a heading of the GNSS unit; and
   a mobile controller configured for wireless communications with the GNSS unit and the IMU, the mobile controller configured to receive the position of the antenna, the tilt, and the heading from the GNSS unit, and to receive the rotation of the bucket from the IMU, the mobile controller configured to determine coordinates of the cutting edge of the bucket in a real world coordinate frame based on the received position of the antenna, the tilt, and the heading.

2. The system of claim 1 wherein the survey pole includes an upper portion of a grade rod that has been removably detached from a lower portion of the grade rod and the survey pole does not include a tip.

3. The system of claim 1 wherein the GNSS unit includes a GNSS receiver.

4. The system of claim 1 wherein the mobile controller is a cell phone.

5. A system for tracking a position of a cutting edge on a bucket of a skidsteer, the bucket coupled to the skidsteer at a pivot point between arms of the skidsteer and the bucket, a hydraulic mechanism coupled to the arms and configured to provide rotational movement of the bucket, an inertial measurement unit (IMU) coupled to the bucket and configured to determine rotation of the bucket, the system comprising:
   a survey pole coupled to a side of one of the arms of the skidsteer using a mounting mechanism, the mounting mechanism removably attached to a middle portion of the survey pole so that a first portion of the survey pole extends beyond a top of the mounting mechanism and a second portion of the survey pole extends beyond a bottom of the mounting mechanism;
   a global navigation satellite system (GNSS) unit coupled to the first portion of the survey pole, the survey pole arranged relative to the arms of the skidsteer so that the GNSS unit remains free from contact with any part of the skidsteer, the bucket, or the arms during a full range of motion of the arms, the GNSS unit including an antenna arranged in a known spatial relationship with the pivot point between the arms of the skidsteer and the bucket, the GNSS unit configured to determine a position of the antenna and a tilt and a heading of the GNSS unit; and
   a mobile controller configured for wireless communications with the GNSS unit and the IMU, the mobile controller configured to receive the position of the antenna, the tilt, and the heading from the GNSS unit, and to receive the rotation of the bucket from the IMU, the mobile controller configured to determine coordinates of the cutting edge of the bucket in a real world coordinate frame based on the received position of the antenna, the tilt, and the heading.

6. The system of claim 5 wherein the survey pole includes an upper portion of a grade rod that has been removably detached from a lower portion of the grade rod and the survey pole does not include a tip.

7. The system of claim 5 wherein the mobile controller is a cell phone.

8. A system for tracking a position of a working edge on an implement of a construction vehicle, the implement coupled to the construction vehicle at a pivot point between a rigid member of the construction vehicle and the implement, a hydraulic mechanism coupled to the rigid member and configured to provide rotational movement of the implement, an angle sensor coupled to the implement and configured to determine rotation of the implement, the system comprising:
   a survey pole coupled to the rigid member using a mounting mechanism, the mounting mechanism removably attached to a middle portion of the survey pole so that a first portion of the survey pole extends beyond a top of the mounting mechanism and a second portion of the survey pole extends beyond a bottom of the mounting mechanism;

a global navigation satellite system (GNSS) unit coupled to the first portion of the survey pole, the survey pole arranged relative to the rigid member so that the GNSS unit remains free from contact with any part of the construction vehicle, the implement, or the rigid member during a full range of motion of the rigid member, the GNSS unit arranged in a known spatial relationship with the pivot point between the rigid member of the construction vehicle and the implement, the GNSS unit configured to determine a position, a tilt, and a heading of the GNSS unit; and a mobile controller configured for wireless communications with the GNSS unit and the angle sensor, the mobile controller configured to receive the position, the tilt, and the heading from the GNSS unit, and to receive the rotation of the implement from the angle sensor, the mobile controller configured to determine coordinates of the working edge of the implement in a real world coordinate frame based on the received position, the tilt, and the heading.

9. The system of claim 8 wherein the construction vehicle is an excavator.

10. The system of claim 8 wherein the construction vehicle is a skidsteer.

11. The system of claim 8 wherein the implement includes a bucket.

12. The system of claim 8 wherein the rigid member includes a stick of an excavator.

13. The system of claim 8 wherein the rigid member includes arms of a skidsteer.

14. The system of claim 8 wherein the mobile controller is a cell phone.

15. The system of claim 8 wherein the angle sensor includes an inertial measurement unit (IMU).

16. The system of claim 8 wherein the survey pole is a grade rod.

17. A system for tracking a position of a working edge on an implement of a construction vehicle, the system comprising:
a survey pole;
a global navigation satellite system (GNSS) unit including an antenna coupled to the survey pole, the GNSS unit configured to determine a position of the antenna and a tilt and a heading of the GNSS unit;
a mounting mechanism configured to couple the survey pole to a rigid member of the construction vehicle, the mounting mechanism removably attached to a middle portion of the survey pole so that a first portion of the survey pole extends beyond a top of the mounting mechanism and a second portion of the survey pole extends beyond a bottom of the mounting mechanism, the rigid member coupling the implement to the construction vehicle and the rigid member coupled to the implement at a pivot point between the rigid member and the implement, the mounting mechanism configured to couple the survey pole to the rigid member so that the antenna is arranged in a known spatial relationship with the pivot point between the rigid member and the implement; and
a mobile controller configured for wireless communications with the GNSS unit and an angle sensor, the angle sensor configured to determine rotation of the implement, the mobile controller configured to receive the position of the antenna, the tilt, and the heading from the GNSS unit, and to receive the rotation of the implement from the angle sensor, the mobile controller configured to determine coordinates of the working edge of the implement in a real world coordinate frame based on the received position of the antenna, the tilt, and the heading from the GNSS unit.

18. The system of claim 17 wherein the mounting mechanism is configured so that the survey pole can be rigidly attached to the mounting mechanism and so that the survey pole can be detached from the mounting mechanism, and wherein the mounting mechanism is configured so that when the survey pole is attached to the mounting mechanism, the antenna of the GNSS unit is arranged in approximately the known spatial relationship with the pivot point between the rigid member and the implement.

19. The system of claim 17 wherein the mobile controller is a cell phone.

20. The system of claim 17 wherein the angle sensor includes an inertial measurement unit (IMU).

21. A system for tracking a position of a working edge on an implement of a construction vehicle, the system comprising:
a survey pole;
a global navigation satellite system (GNSS) unit including an antenna coupled to the survey pole, the GNSS unit configured to determine a position of the antenna and a tilt and a heading of the GNSS unit;
a mounting mechanism configured to couple the survey pole to a rigid member of the construction vehicle, the mounting mechanism removably attached to a middle portion of the survey pole so that a first portion of the survey pole extends beyond a top of the mounting mechanism and a second portion of the survey pole extends beyond a bottom of the mounting mechanism, the rigid member coupling the implement to the construction vehicle and the rigid member coupled to the implement at a pivot point between the rigid member and the implement; and
a mobile controller configured for wireless communications with the GNSS unit and an angle sensor, the angle sensor configured to determine rotation of the implement, the mobile controller configured to receive the position of the antenna, the tilt, and the heading from the GNSS unit, and to receive the rotation of the implement from the angle sensor, the mobile controller configured to determine coordinates of the working edge of the implement in a real world coordinate frame based on the received position of the antenna, the tilt, and the heading from the GNSS unit.

22. The system of claim 21 wherein the construction vehicle is an excavator, the implement is a bucket of the excavator, and the rigid member is a stick of the excavator.

23. The system of claim 21 wherein the construction vehicle is an skidsteer, the implement is a bucket of the skidsteer, and the rigid member is an arm of the skidsteer.

* * * * *